United States Patent [19]

Bullinger et al.

[11] Patent Number: 4,795,519

[45] Date of Patent: Jan. 3, 1989

[54] DEVICE FOR TESTING AND REPROCESSING OF OBJECTS

[75] Inventors: Siegfried Bullinger, Ilshofen; Walter Busch, Frankenhardt-Gründelhardt; Willi Sperrle, Satteldorf, all of Fed. Rep. of Germany

[73] Assignee: Bausch & Strobel Maschinenfabrik GmbH & Co., Ilshofen, Fed. Rep. of Germany

[21] Appl. No.: 838,417

[22] Filed: Mar. 10, 1986

Related U.S. Application Data

[63] Continuation of Ser. No. 486,339, Apr. 19, 1983, abandoned.

[30] Foreign Application Priority Data

Apr. 22, 1982 [DE] Fed. Rep. of Germany ....... 3215297

[51] Int. Cl.⁴ .................. B65C 9/02; B65C 9/06; B65C 9/26; B65C 9/44
[52] U.S. Cl. ..................... 156/363; 29/714; 53/505; 156/379; 156/566; 198/577
[58] Field of Search ............ 53/493, 505; 198/341, 198/577; 29/714; 156/363–364, 378–379, 556, 566, 64, 567, DIG. 25, DIG. 44, DIG. 45

[56] References Cited

U.S. PATENT DOCUMENTS

| | | | |
|---|---|---|---|
| 2,936,921 | 5/1960 | Schulz | 156/363 |
| 3,954,542 | 5/1976 | Solomon et al. | 156/379 |
| 3,964,947 | 6/1976 | Mort, Jr. et al. | 156/328 |
| 4,011,155 | 3/1977 | Feurstein et al. | 156/351 |
| 4,084,686 | 4/1978 | Calhoun | 198/468 |
| 4,454,939 | 6/1984 | Kampf et al. | 198/465 |

Primary Examiner—Merrell C. Cashion, Jr.
Attorney, Agent, or Firm—Wood, Dalton, Phillips, Mason & Rowe

[57] ABSTRACT

A conveying device for testing and reprocessing objects (25) processed by a processing station (27), especially labelled objects (25), as for example ampoules, containers or syringes. A conveyor device conveys objects (25) to be processed in a continual, uniform motion through the processing station (27). The objects (25) are held therein in pickups (23). A feeding device (33) leads the objects individually toward the conveying device (21). A checking station (31) examines the processing result. A control stops, in case of determining an insufficiently processed, for example not labelled objects (25b), the feeding device (33) and gradually brakes the conveying device (21). The control then reverses the direction of movement of the conveying device (21) until the insufficiently processed object (21b) has reached again the processing station (27). The object is reprocessed, for example labelled, while the conveying device (21) and subsequently the feeding device (33) are engaged in the original direction of movement. Based on the uniform movement of the conveying device (21), it is possible to obtain high working cycle rates with a gentle conveyance of the objects to be processed and reprocessed.

1 Claim, 2 Drawing Sheets a.)

b.)

c.)

d.)

a.)

b.)

c.)

d.)

DEVICE FOR TESTING AND REPROCESSING OF OBJECTS

CROSS-REFERENCE TO RELATED APPLICATION

This application is a continuation of application Ser. No. 486,339, filed Apr. 19, 1983, entitled "A Device For Testing And Reporcessing Of Objects", now abandoned.

BACKGROUND OF THE INVENTION

Summary of the Invention

The invention relates to a device for testing and reprocessing objects processed in a processing station. A conveying device moves several objects arranged in a line in pickups through the processing stations. A controllable feeding device, which carries the objects, leads the objects, one after another, individually to the conveying device. The objects are led appropriately away from the conveying device. A control stops the processing station in case that it detects an insufficiently processed object, at least for the duration of a processing cycle, and delivers again the insufficiently processed object by means of a conveying device to the processing station.

In a labelling device working according to this principle, the objects to be labelled, for example ampoules or other containers, are led over by an intake worm gear to a plate that rotates slowly around a vertical axis. The plate has on its peripheral edge, equidistantly spaced pickups for the ampoules and moves the ampoules held in the pickups in an intermittent movement during the processing cycle past a device that dispenses the labels. An optical testing device, spaced from the point of transfer of objects from the worm gear to the plate by several pickups, checks out the position and the presence of the labels. A discharge worm gear takes the labelled ampoules from the plate.

The ampoules are shifted by a discharge lever operating within the cycle time of the plate from the pick-ups of the plate into the intake path of the discharging worm gear. When the testing device finds a not labelled ampoule, the discharge lever is not activated while this ampoule moves along. The unlabelled ampoule remains on the plate and is led after a full rotation of the plate again into the label dispensing device. The intake worm gear is stopped while the unlabelled ampoule moves along.

Due to the intermittent movement of the plate, the ampoules are subjected to high acceleration forces. The plate is stopped for half of the time of each cycle time and moves during the other half. In spite of the high speed of movement of the ampoules, the working cycle frequency remains relatively low. The working cycle frequency is additionally limited by a discharge lever shoving off the ampoules radially to the plate. The discharge lever must, within the time of a working cycle, shove off an ampoule from its respective pick-up on the plate as well as get out of the path of movement of an unlabelled ampoule. At high working cycle frequencies, the discharge lever applies high acceleration forces to the ampoule.

It is the object of the invention to increase constructively the working cycle frequency of the device explained above. To accomplish this end, the conveying system moves the objects in a continual, uniform movement from the feeding device over the processing station to the conveying mechanism. The testing station examines the result of the processing for every object during the processing of this object in the processing station. The conveying direction of the conveying device is reversible by a control upon detecting an insufficiently processed object. The control stops first the feeding device, then the conveying mechanism until the insufficiently processed object has reached the processing station for reprocessing and reverses. The conveyor mechanism is reversed again and the feeding device immediately or thereafter operated.

Since the conveying system works continually, the rate of processing is not reduced by the intermittent acceleration and braking. Since the result of processing is available at the end of each processing operation, the feeding device can be stopped directly after the end of the processing operation. For braking the conveying device working at an especially high speed there is thus almost a complete processing cycle available. The conveying mechanism can thus be braked gradually. The return run of the conveying device guides the insufficiently processed object through the braking path back into the processing station. The conveying away mechanism can continue to work continually during the reprocessing phase. No separately controllable, mobile discharge levers or the like are necessary. The conveying device and the feeding device work preferably in straight lines. The feeding mechanism conveys expediently merely a few objects to be processed, so that it can be fast braked at the beginning of the reprocessing phase.

The aforementioned object is solved according to the invention in an alternative manner so that the conveying device moves the objects in a continual, uniform movement from the feeding device over the processing station to the conveying device. The direction of conveyance of the conveying device is reversible and the objects placed in the pick-ups of the conveyer device can be conveyed along the feeding device in a reverse direction at the point of feeding. The control stops the feeding device upon finding an insufficiently processed object and reverses the conveying device until the insufficiently processed object has at least reached the processing station and then reverses the conveyigg device and engages the feeding device.

In this device, the pick-ups of the conveying device move along transversely to the direction of movement of the feeding device where they are fed with the objects to be processed. Before reaching the feeding device, the pick-ups of the conveying device move through a "buffering area" in which the objects to be processed can move in along the feeding device after the reversal of the conveying device. This buffering area is suitable for designs in which the testing device of the processing result examines not at the location of the processing device but at a distance from it in tee direction of conveyance.

The continually moving conveyor device can also be gradually braked even in a device where, because of the buffering zone, eventually even more than one processing cycle can be practiced. Moreover, the feeding device can also be gradually stopped so that when braking, one or more objects to be processed are introduced in pickups to the conveying device, operated in a braked down operation. The feeding device is conveniently controlled so that, after determining an insufficiently processed object, the feeding device is braked down, while it brings the following object into the respective pickup of the conveyor device and is brought immediately after to a standstill.

In order to keep the time of the reverse movement of the conveying device during the return of the insufficiently processed object into the processing station as short as possible, the testing station checks the result of processing for each object, preferably during the processing of this object in the processing station, i.e., during its processing cycle.

In preferred embodiments, the conveying device and/or the feeding device is driven by an electric step motor, most appropriately by separate step motors. Such step motors are rotated by driving pulses always by one predetermined angle of rotation per pulse. By changing the pulse rate, it is possible to control the driving speed and eventually the acceleration and braking processes. By counting the pulses, it is possible to control exactly the distance over which the feeding device and the conveying devie move the objects. Instead of a step motor, it is also possible to use other electric motors, especially d.c. motors with a permanent magnet stator or a disc rotor motor which are connected preferably to a control circuit with a tachometer monitoring the actual r.p.m.

The processing station is preferably a labelling device for applying adhesive labels on objects fed by the conveying device, especially on containers, ampoules, syringes or similar. Other areas of application are for example washing, filling, closing or printing containers or similar.

In the following pages, examples of execution of the invention will be explained in detail based on the drawings.

DETAILED DESCRIPTION OF THE DRAWINGS

Figure 1:
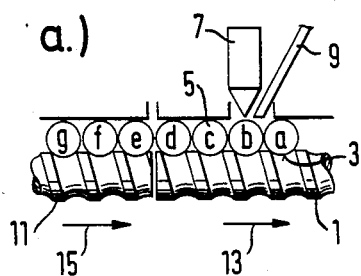
FIGS. 1a to 1d, a processing device is shown with a conveying device fed in its line of conveyance with objects to be processed in subsequent reprocessing phases.
Figure 1:
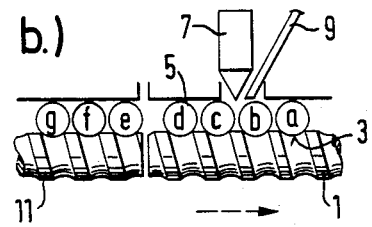
Figure 1:
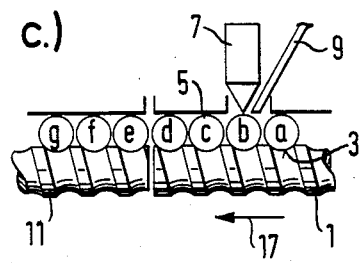
Figure 1:
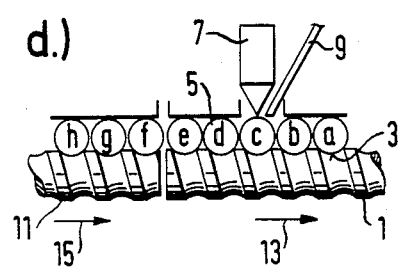

FIG. 1 shows a conveying device 1 comprising a conveyer worm that is driven at a constant speed and which moves along in pickups 3 of its convolute paths, objects 5, for example bottles, ampoules or syringes, for processing by a labelling device. A testing device 9 examines the result of the processing and gives, before starting the next processing cycle, a correction signal when the object 5 is insufficiently processed. The objects to be processed are fed into the conveying device by a feeding device 11, preferably also a conveyor worm, along the line of conveyance of the conveying device 1. The conveying device moves the objects marked with consecutive letters of the alphabet, in the direction of an arrow 13 along the processing station 7. The direction of movement of objects by the feeding device 11 is illustrated by an arrow 15. A separate conveying device takes over the processed objects at the outlet of the conveying device 1.

The drives for the conveyor device 1 and feeding device 11, which are separately controllable step motors ar controlled so that a subsequent processing of insufficiently processed objects is rendered possible. The direction of conveyance of the conveying device 1 is reversible, and it is possible to stop the feeding device 11 after processing one of the objects in the processing station 7, before feeding a further object to be processed into the conveying device 1. The testing device 9 detects insufficiently processed object 5b during its processing. The testing device 9 through a control (not shown), stops the feeding device 11, which comes oo a standstill before the next object 5e, which is to be fed into the conveying device 1, arrives on the conveying device (FIG. 1b). The conveying device 1 is simultaneously gradually brakdd and comes thus to a standstill before the next to be processed object 5c reaches the processing station 7. With the feeding device 11 at a standstill, the control reverses the conveying direction of the conveyor device 1 (arrow 17 in FIG. 1c), until the insufficiently processed object 5c has reached again the processing station 7. The control then directs the conveyor device 1 in its original feed direction, illustrated by arrow 13 and starts the feeding device 11. The insufficiently processed object 5b is reprocessed and subsequently the following object 5c (FIG. 1d) is processed i.e. labelled.

Figure 2:
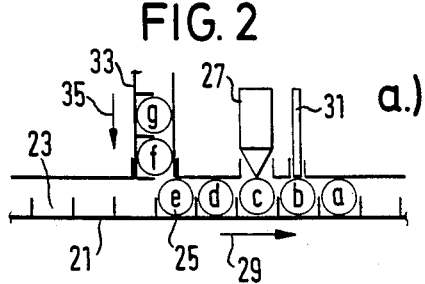
FIGS. 2a to 2d show a processing device with a feeding device advancing objects angularly with respect to the conveying device with the objects to be processed in subsequent phases of reprocessing.
Figure 2:
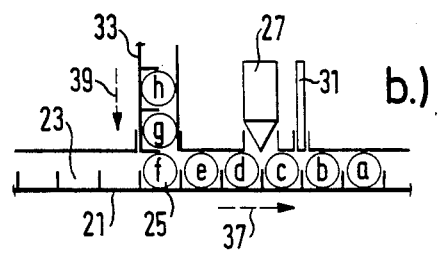
Figure 2:
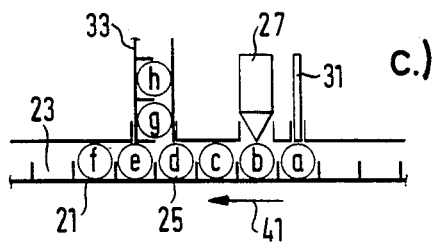
Figure 2:
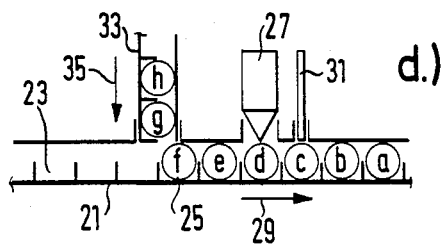

FIG. 2 shows a conveying device 21, here a conveyer chain, provided with pickups 23, which moves along objects 25 to be processed in a continuous sequence at a uniform speed to a processing station 27, for example a labelling installation, for the application of adhesive labels. Beyond the working station 27 in the conveying direction 29 of the conveying device 21 is a testing station 31 which rechecks the result of the processing. A feeding device 33, also a conveyor chain, is provided with pickups for the objects and leads the objects along a first path defined by movement of the objects 25 to be processed in the direction of an arrow 35, and than movement transversely in the forward direction of conveyance 29. A conveying device (not shown), removes the processed objects from the conveying device 21.

A control (not illustrated) allows reprocessing of insufficiently processed objects when the testing station 31 detects an insufficiently processed object, for example the object 25b. The control switches off the drives of the conveyor device 21 and those of the feeding device 33 which gradually slow down as indicated in FIG. 2b by dashed arrows 37, 39 respectively. Control devices might be provided to enable a controlled braking which can be accomplished through step motors by a continual changing of the driving pulse rates. The conveying device 21 comes to a stop before the next object 25d to be processed has reached the processing station 27. The feeding device 33 stops, after having introduced the next object 25f that is transferred to a pickup on the conveying device 21 (FIG. 2b).

With the feeding device 33 at a stansstill, the control reverses the direction of conveyance of the conveying device 21 as indicated by the arrow 41 in FIG. 2c, until the object to be reprocessed 25b has again reached the processing station 27. Upon rearward movement in the direction of arrow 41, objects 25e and 25f are directed out of the previously described first conveying path for the objects 25, as shown in FIG. 2c, and are temporarily stored outside of the first conveying path at a location to the left of the feeding device 33 in FIG. 2c. During or after the subsequent reprocessing of the object 25b, the control switches again so that the conveying device 21 moves in the original direction of conveyance as shown by arrow 29 until the object 25, last transferred from the feedin device 33 to the conveying device 21, has again reached its feeding postion. At the same time, temporarily stored objects 25e and 25f are reintroduced to the first path, as shown in FIG. 2d. The feeding device is then restarted.

The testing station 31, illustraeed in FIG. 2, corresponds in operation to that in FIG. 1. Monitoring of the processing occurs, during the processing cycle of the processing station.

Instead of conveying objects in a straight line like the feeding devices illustrated in FIG. 1 and 2, it is equally possible to use devices moving circularly. Instead of worm gear conveying devices or chain conveying devices, it is also possible to use other type conveyors. Step motors are preferably used for driving conveying as well as feeding devices.

Figure 3:
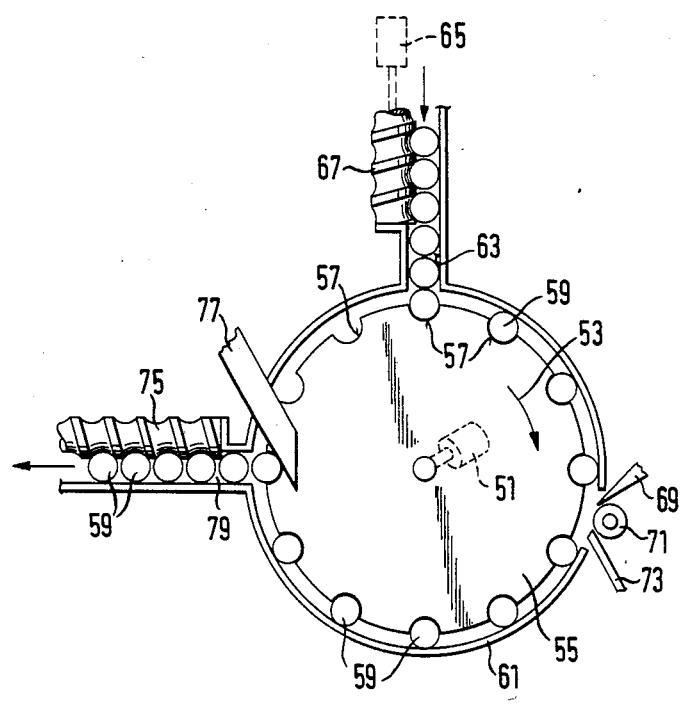
FIG. 3 shows schematically in top view a labelling device.

FIG. 3 shows details of a labelling mechanism working according to the principle of FIG. 2. A plate 55, driven by a step motor 51 continually and at a constant speed of rotation around a vertical axis in the direction of an arrow 53, has on its periphery spaced pickups 57 for objects 59 to be labelled. A circular guide 61 holds the objects in the pickups 57. An inlet worm drive 67, driven by a separate step motor 65, continuously feeds objects 59 to the pickups through a radial inlet channel 63.

The plate 55 moves the objects 59 from the inlet 63, arranged angularly with respect to the plate periphery in front of a label dispensing station 69 that applies adhering labels to the objects 59 and massages them on by a massaging friction ooller 71. An optical testing device 73 checks out whether the label dispensing station 69 has applied a label. A discharging worm gear 75 is arranged angularly to the plate periphery and downstream of the testing device 73. A stationary discharger 77, radially intersecting the plate 55, deflects the labelled objects from the pickups 57 into an inlet channel 79 of the discharge worm gear 75.

The massaging roller 71 is drivenoover a freewheeling gear in order to be able to follow a reverse movement.

An additional control (not shown) controls the step motors 51 and 65 in the manner explained with the help of FIG. 2, when the testing device 73 catches an unlabelled object 59. The plate 55 is gradually braked using almost the entire peripheral distance between two adjacent objects. The inlet worm 67 is braked so that the next object found in its outlet channel 63, is introduced into the next empty pickup 57 before the inlet worm 67 is stopped. The inlet worm 67 can also be stopped over a relatively wide angle of rotation of the worm gear. The reverse motion and the renewed conveyance in the direction of the arrow 53, as well as the engagement of the inlet worm gear 67, take place analogously to the operation of the device in FIG. 2.

Instead of the step motor 61 and/or 65, other electric motors, for example d.c. motors with a permanent magnet stator, or a disc rotor motor can be used, connected to a closed speed control circuit of the control and coupled with a tachometer that controls the actual r.p.m. of the motor.

We claim:

1. A mechanism for testing and reprocessing objects (25,59) conveyed through and processed at a processing station (27,69) comprising:
    a first conveying means (21,55) having pickups (23,57) holding a plurality of the objects (25,59) for advancing the objects in a substantially regular movement reversibly, serially through the processing station (27,69);
    a feeding means (33,63) for directing the objects (25,59) one after the other to the first conveying means (21,55);
    said objects moved by the feeding means (33,63) and first conveyor means (21,55) operating in a forward direction along a first path;
    a testing station (31,73) for checking the results of processing at the processing station (27,69);
    control means for stopping the feeding means (33,63) and first conveying means (21,55) before a subsequent object (25,59) is fed to the processing station (27,69) upon said testing means (31,73) detecting an unsuitably processed object (25,59), reversing the first conveyor means (21,55) from a forward movement to resituate the unsuitably processed object (25,59) upstream to the processing station (27,69), restarting the first conveying means (21,55) to thereby reprocess a previously unsuitably processed object (25,59) at the processing station, and restarting the feeding means (33,63) after the first conveying means (21,55) is restarted;
    object storing means outside of said first path for temporarily storing at least one of the objects;
    means for directing at least one of the objects out of said first path from a first location in said first path to said storing means after said control means has reversed said first conveyor means to reprocess said unsuitably processed object; and
    means for reintroducing the at least one temporarily stored object into the conveying means at the first location.

* * * * *